United States Patent [19]
Nakamoto

[11] Patent Number: 5,608,466
[45] Date of Patent: Mar. 4, 1997

[54] COLOR PICTURE SYNTHESIZER PRODUCING AN ACCURATE CHROMA-KEY DESPITE VARIATIONS IN THE INTENSITY LEVEL OF A DESIGNATED COLOR SIGNAL

[75] Inventor: Nobuya Nakamoto, Tokyo, Japan

[73] Assignee: NEC Corporation, Tokyo, Japan

[21] Appl. No.: 360,292

[22] Filed: Dec. 21, 1994

[30] Foreign Application Priority Data

Dec. 28, 1993 [JP] Japan .................. 5-336607

[51] Int. Cl.⁶ .............. H04N 9/75; H04N 5/275
[52] U.S. Cl. .............. 348/587; 348/592; 348/596
[58] Field of Search .................. 348/587, 592, 348/596, 649, 651; 358/22, 22 CK, 22 PI; H04N 5/275, 5/272, 5/262, 9/74, 9/75

[56] References Cited

FOREIGN PATENT DOCUMENTS

| | | |
|---|---|---|
| 57-196682 | 12/1982 | Japan . |
| 63-240192 | 10/1988 | Japan . |
| 1-318385 | 12/1989 | Japan . |
| 2-092170 | 3/1990 | Japan . |
| 2-211791 | 8/1990 | Japan . |

*Primary Examiner*—Sherrie Hsia
*Attorney, Agent, or Firm*—Foley & Lardner

[57] ABSTRACT

In a color picture synthesizer, an effective display area is predetermined. An intensity of a designated color in the area is compared to a maximum value and a minimum value. A chroma-key is generated for each intensity value within the range of the maximum value and the minimum value.

4 Claims, 3 Drawing Sheets

COLOR PICTURE SYNTHESIZER PRODUCING AN ACCURATE CHROMA-KEY DESPITE VARIATIONS IN THE INTENSITY LEVEL OF A DESIGNATED COLOR SIGNAL

BACKGROUND OF THE INVENTION

This invention relates to a color picture synthesizer, and more particularly to a synthesizer wherein chroma-key is used.

Heretofore, there have been two types of color picture synthesis. The one system is analog signal synthesis and the other system is digital signal synthesis. As shown in FIG. 3, a high speed switching signal which is delivered from a data controller 301 controls a superimpose controller 302 for connecting either one of the two input analog color picture as the output.

FIG. 4 shows an example wherein a chroma-key is used. A chroma-key extraction circuit 402 extracts a specified color signal from an analog color picture 2, and this extracted key signal deletes the analog color picture 2 in an analog synthesizer 401. Color picture synthesizers with chroma-key are disclosed in a Japanese patent application entitled "A chroma-key apparatus" and laid open as a Provisional Publication No. 211791/90 and another Japanese patent application entitled "A magnetic recording and reproducing apparatus with a built-in camera" and laid open as a Provisional Publication No. 318385/89.

FIG. 5 shows a digital synthesizer where two digital color pictures are synthesized in a digital synthesizer 501. A prior art of digital synthesis is disclosed in a Japanese patent application entitled "Digital superimpose system" and laid open as a Provisional Publication No. 92170/90.

In the prior arts shown in FIG. 3 and FIG. 4, an analog switch (not shown in the drawings) operated by the switching signal or by the key signal has an inevitable time lag in operation. The time lag causes a slippage or a blur at a boundary of switching. And in a chroma-key synthesis, insufficient color extraction also causes a blur. In a case when a chroma-key is used, for example, to take out a designated color component from digitized signals of an analog color picture, and to fill up the space with another digital color picture, the prior art disclosed in the "Digital superimpose system" of the Provisional Publication No. 92170/90, can not be used, because there are intensity fluctuations of the designated color component.

In the prior art entitled "A chroma-key apparatus", the intensity level of the designated color component is used for determining stretching and clipping levels of a color selection circuit. This process is efficient to optimize the chroma-key level, but the process is insufficient in the accuracy of optimization.

In recent years, window systems for displaying other pictures such as pictures reproduced from video tapes in a display of a color picture produced in a computer, have been developed. In such window systems, there is a wide variety of analog color signal intensities among individual products of a same apparatus. A color picture synthesizer of the prior art can not cope with these intensity fluctuations.

SUMMARY OF THE INVENTION

Therefore, a primary object of the present invention is to provide a color picture synthesizer wherein a chroma-key is accurately produced in spite of intensity fluctuations of the intensity level of a designated color signal.

In order to achieve the object, a first digital color picture produced by a host computer and a second digital color picture converted from an analog colorpicture are synthesized in a picture synthesizer. An area where the first digital color picture is superimposed on the second digital color picture is predetermined. The maximum intensity and the minimum intensity of a designated color component in the area are determined. All the designated color component in the area having intensity levels between the maximum intensity and the minimum intensity are used as chroma-keys. Each chroma-key of these chroma-keys substitute the corresponding pixel of the second digital color picture by the corresponding pixel of the first color picture.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

DETAILED DESCRIPTION OF THE PREFERRED EMBODIMENTS

Figure 1:
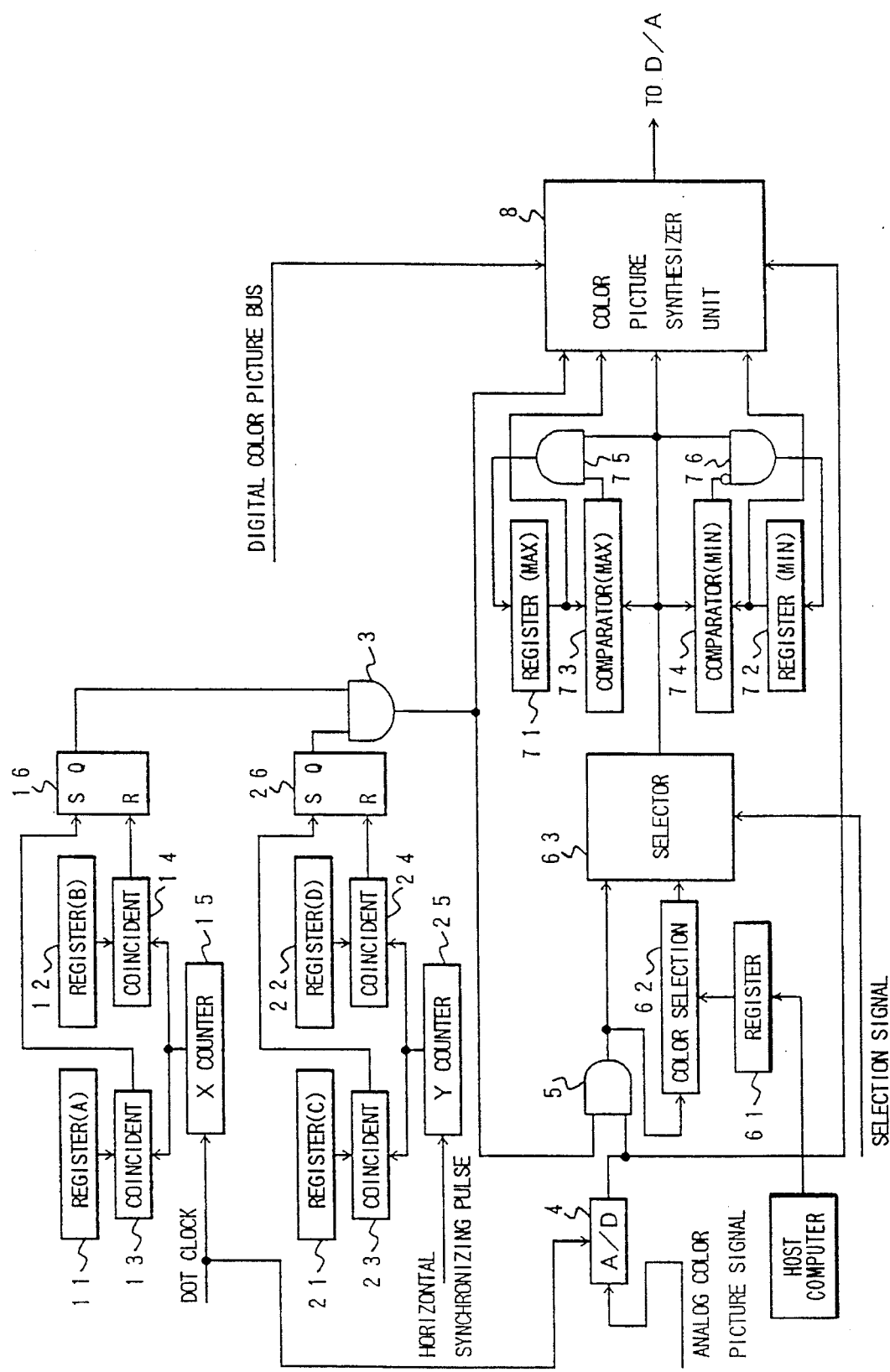
FIG. 1 shows a block diagram of an embodiment of this invention.

Referring to FIG. 1, a first register 11, a second register 12, a first coincident circuit 13, a second coincident circuit 14, an X counter 15, a first flipflop 16, a third register 21, a fourth register 22, a third coincident circuit 23, a fourth coincident circuit 24, a Y counter 25 and a second flipflop 26, and an and gate 3 constitute an arrangement for determining an effective display area indicator.

A host computer loads these registers 11,12,21,22 with coordinate values A, B, C, D respectively, where x=A, x=B(B>A), y=C, Y=D(D>C) are the four side lines of a rectangle. The X counter 15 is reset by a horizontal synchronizing pulse (circuit not shown in the drawing) and counts dot clocks. When the count of the X counter 15 coincides with the contents of the register 11, the coincident circuit 13 delivers a pulse and sets the flipflop 16. When the count of the X counter 15 coincides with the contents of the register 12, the coincident circuit 14 delivers a pulse and resets the flipflop 16. The Y counter 25 is reset by a vertical synchronizing pulse (circuit not shown in the drawing) and counts the horizontal synchronizing pulses. When the count of the Y counter 25 coincides with the contents of the register 21, the coincident circuit 23 delivers a pulse and sets the flipflop 26. When the count of the Y counter 25 coincides with the contents of the register 22, the coincident circuit 24 delivers a pulse and resets the flipflop 26. Thus, the output of the andgate 3 is at logic "H" during the time when the effective display area defined by the rectangle is scanned.

An analog to digital (A/D) converter 4 converts an analog color picture signal to a digital color picture signal at a sampling rate of the dot clock. At the output of the A/D 4, a pixel of a digital color picture is represented by three digital values denoting RGB three color intensity values. The output of the A/D 4 pass an andgate 5 when the output of the andgate 3 is logic "H".

In this specification, a digital color picture means a color picture in which each pixel value is represented by three digital words representing RGB three color intensities.

A color selection circuit 62 selects a designated color intensity value from the RGB three color intensity values or composes such a designated color intensity value as B-Y from the three color intensity values. The color to be selected in the color selection circuit 62 is determined in accordance with the contents of a register 61 where the host computer loads a command for controlling the color selection circuit 62. A selector 63 selects the output of the andgate 5 or the color selection circuit 62 to deliver as an output in accordance with a selection signal from the host computer.

Figure 2:
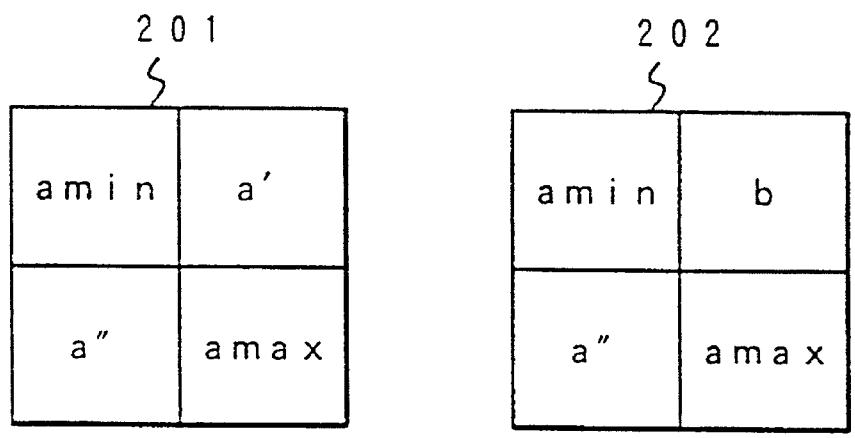
FIG. 2 shows examples of pixels in an effective display area.
Figure 3:
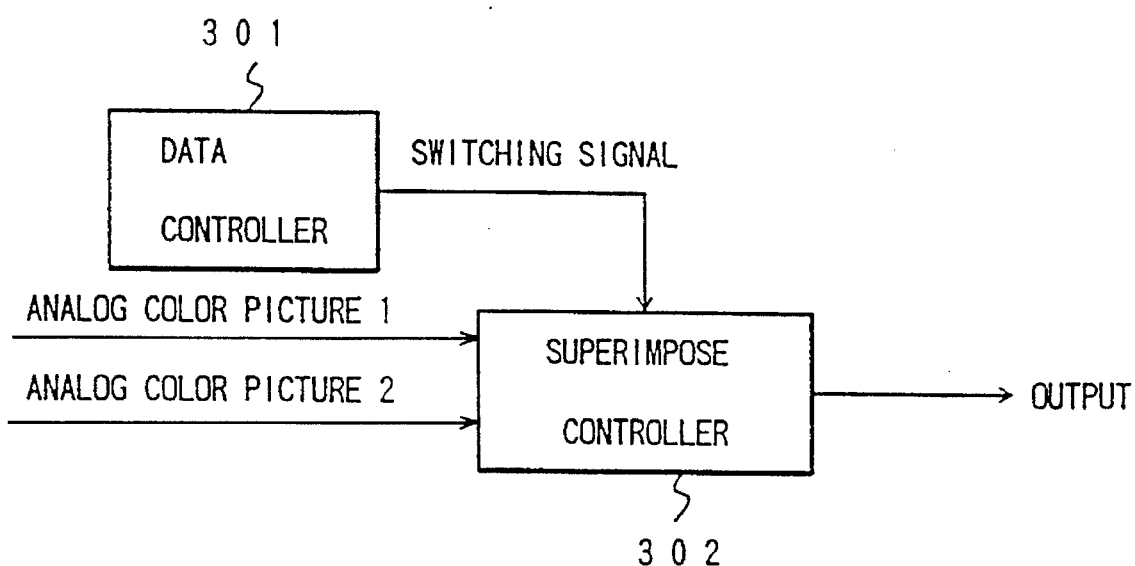
FIG. 3 shows an example of a prior art.
Figure 4:
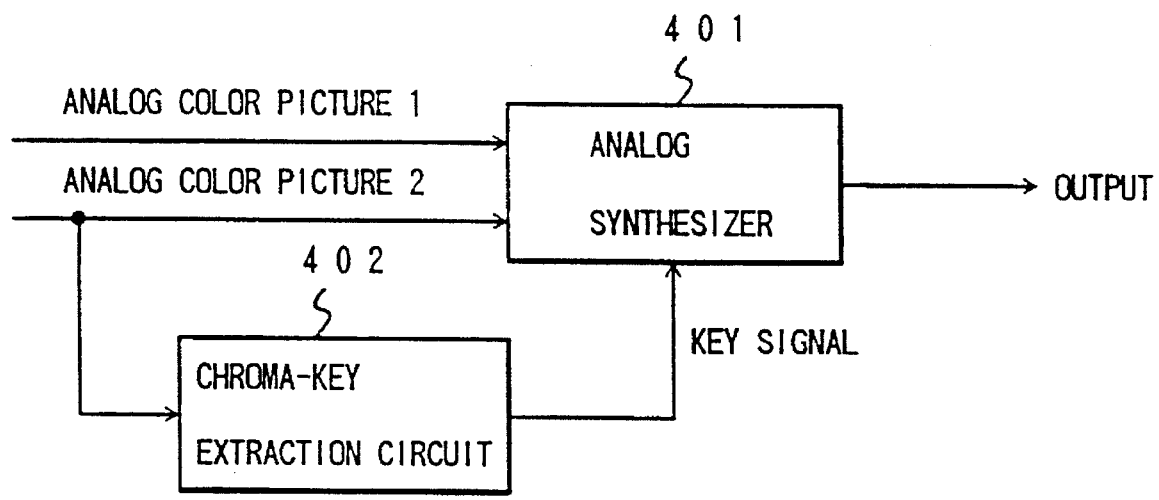
FIG. 4 shows another example of a prior art.
Figure 5:
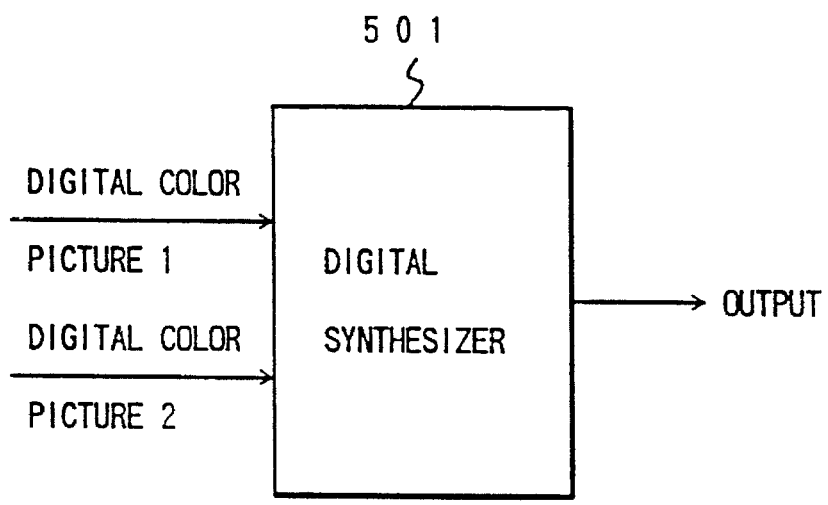
FIG. 5 shows still another example of a prior art.

Referring to FIG. 2, there are two types of an array of pixels in an effective area of display. In a type shown by numeral 201, all the pixels have a same color denoted by "a" with different intensities as denoted by "a'","a''","amin", "amax". For this type of an array of pixels, the output of the andgate 5 is the output from the selector 63. In a type shown by numeral 202, a pixel having a color "b" different from the color "a" is included, and for this type of array of pixels, the output of the color selection circuit 62 is the output from the selector 63.

A maximum value register 71, a minimum value register 72, a comparator 73, another comparator 74, an andgate 75 and another andgate 76 composes a compare and substitute circuit. At an initialization, a sufficiently small value is loaded in the register 71, and a sufficiently large value is loaded in the register 72. The comparator 73 compares the output of the selector 63 with the contents of the register 71, and when the output of the selector 63 is larger than the contents, the output of the selector 63 is loaded to the register 71 through an andgate 75. The comparator 74 compares the output of the selector 63 with the contents of the register 72, and when the output of the selector 63 is smaller than the contents, the output of the selector 63 is loaded to the register 72 through an andgate 76.

Thus, a first output of the selector 63 is loaded in both registers 71,72. In succeeding output from the selector 63, a maximum value of the output is loaded in the register 71, and a minimum value of the output is loaded in the register 72. As long as the output continues, the contents of the register 71 is substituted by a larger value, and the contents of the register 72 is substituted by a smaller value.

The contents of these registers 71,72 determine a range wherein the output of the selector 63 is used as a chroma-key. In a color picture synthesizer 8, data from the A/D 4 in the effective display area are deleted by chroma-keys and replaced by data of a first digital color picture on a digital color picture bus from the host computer.

The first digital color picture may be read out from a video memory or may be a digital color picture converted from an analog color picture.

What is claimed is:

1. A color picture synthesizer for synthesizing a first digital color picture and a second digital color picture comprising:

an effective display area indicator for generating an "on" signal during a time when a predetermined area of said second digital color picture is scanned;

an andgate for transferring said second digital color picture when said "on" signal from said effective display area indicator is delivered;

a color selection circuit for producing an intensity of a designated color for each pixel delivered from said andgate;

a compare and substitute circuit for receiving output of said color selection circuit, comparing the output of said color selection circuit with contents of a maximum value register and a minimum value register, and substituting said contents of said maximum value register by said output of said color selection circuit when said output of said color selection circuit is larger than said contents of said maximum value register, while substituting said contents of said minimum value register by said output of said color selection circuit when said output of said color selection circuit is smaller than said contents of said minimum value register; and a color picture synthesizer unit which receives said first digital color picture, said second digital color picture, said output of said color selection circuit, said contents of said maximum value register, and said contents of said minimum value register, makes each output of said color selection circuit within a range defined by said contents of said maximum value register and said contents of said minimum value register a chroma-key, and substitutes each pixel in said second digital color picture corresponding to the chroma-key by a corresponding pixel in said first digital color picture.

2. A color picture synthesizer of claim 1, wherein said effective display area indicator comprises:

four registers for storing data of four side lines of a rectangle, a first register storing data "A" of a first side line where x=A, a second register storing data "B" of a second side line where x=B(B>A), a third register storing data "C" of a third side line where y=C, a fourth register storing data "D" of a fourth side line where y=D(D>C);

an X counter for counting dot clocks and being reset by horizontal synchronizing pulses;

a Y counter for counting said horizontal synchronizing pulses and being reset by a vertical synchronizing pulse;

a first coincident circuit for generating a pulse to set a first flipflop when count of said X counter coincides with contents of said first register;

a second coincident circuit for generating a pulse to reset said first flipflop when the count of said X counter coincides with contents of said second register;

a third coincident circuit for generating a pulse to set a second flipflop when count of said Y counter coincides with contents of said third register;

a fourth coincident circuit for generating a pulse to reset said second flipflop when the count of said Y counter coincides with contents of said fourth register; and an andgate where a logic product of output of said first flipflop and output of said second flipflop is generated.

3. A color picture synthesizer of claim 1, wherein said second digital color picture is produced from an analog color picture by an analog to digital converter using a sampling clock synchronized with said first digital color picture.

4. A color picture synthesizer of claim 1, wherein said color selection circuit is controlled from contents of a register where a designated color information is loaded from a host computer.

* * * * *